(12) United States Patent
Quigley et al.

(10) Patent No.: US 7,758,102 B2
(45) Date of Patent: Jul. 20, 2010

(54) INTERIOR FOLDING ARMREST FOR AUTOMOTIVE VEHICLE DOOR

(75) Inventors: Douglas Quigley, Rochester Hills, MI (US); Robert Smyczynski, Metamora, MI (US); Irina Zavatski, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 21 days.

(21) Appl. No.: 11/971,270

(22) Filed: Jan. 9, 2008

(65) Prior Publication Data

US 2008/0164718 A1 Jul. 10, 2008

Related U.S. Application Data

(60) Provisional application No. 60/884,085, filed on Jan. 9, 2007.

(51) Int. Cl.
*B60N 2/46* (2006.01)
(52) U.S. Cl. .................. 296/153; 296/155; 297/411.21
(58) Field of Classification Search ................ 296/153, 296/1.09, 155; 297/411.21
See application file for complete search history.

(56) References Cited

U.S. PATENT DOCUMENTS

| 3,489,458 | A | * | 1/1970 | Karlsen ................. 297/411.37 |
| 5,076,645 | A | * | 12/1991 | Yokota .................. 297/411.32 |
| 5,433,509 | A | * | 7/1995 | Hotary et al. .......... 297/411.33 |
| 5,967,594 | A | | 10/1999 | Ramanujam |
| 6,145,919 | A | | 11/2000 | Mysliwiec et al. |
| 6,837,544 | B2 | * | 1/2005 | Bornchen et al. ....... 297/411.21 |
| 7,080,882 | B2 | * | 7/2006 | Stitt ........................ 297/217.3 |
| 7,384,092 | B2 | * | 6/2008 | Hodges ..................... 296/153 |
| 2003/0234554 | A1 | * | 12/2003 | Maierholzner .............. 296/153 |

FOREIGN PATENT DOCUMENTS

FR 2877900 * 11/2004

\* cited by examiner

*Primary Examiner*—Dennis H Pedder
(74) *Attorney, Agent, or Firm*—Ralph E. Smith

(57) ABSTRACT

An interior armrest for a sliding door assembly of a motor vehicle having a hollow housing that is pivotally movable about a pivot axis between a horizontal position for use as an armrest and a vertical position for storage is disclosed. The housing includes an actuator for automatically moving the armrest to the vertical position from the horizontal position as the sliding door moves between the closed and the open position. The armrest is disposed within a recess of the sliding door assembly when in the vertical position.

20 Claims, 2 Drawing Sheets

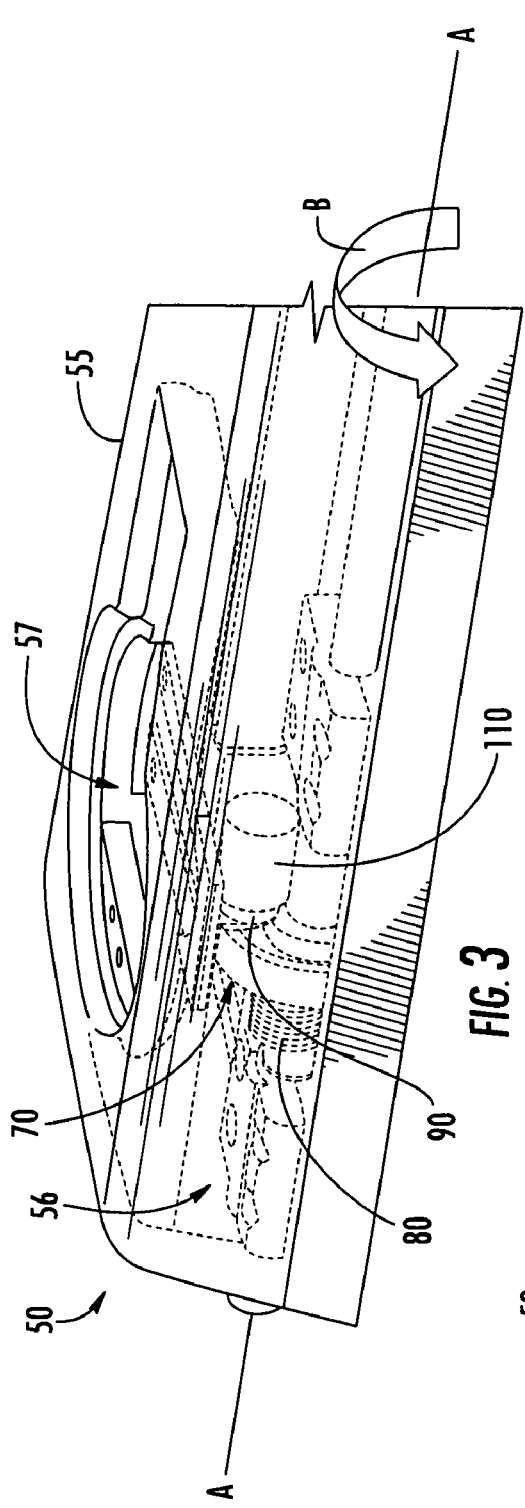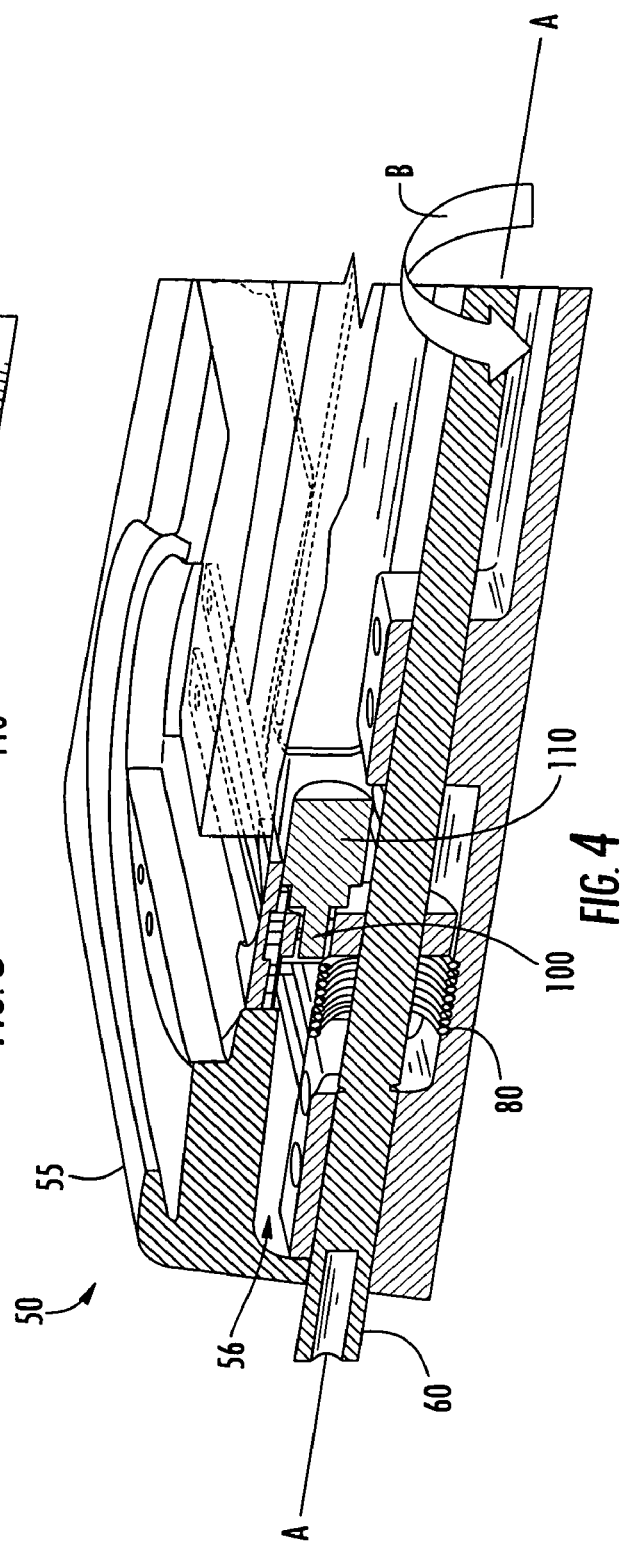

INTERIOR FOLDING ARMREST FOR AUTOMOTIVE VEHICLE DOOR

CROSS REFERENCE TO RELATED APPLICATION

This application claims priority from U.S. Provisional Patent Application Ser. No. 60/884,085, filed on Jan. 9, 2007.

FIELD OF THE INVENTION

The present invention relates generally to an armrest for a door structure of a motor vehicle, and, more particularly, to an interior folding armrest of a vehicle door structure.

BACKGROUND OF THE INVENTION

The use of armrests on the interior of motor vehicles has been known for some time. Increasingly, manufacturers have begun to include sliding doors as a design feature on motor vehicles such as vans, minivans and pickup trucks. However, sliding doors typically do not include armrests for the use of the passengers due to packaging problems associated with movement of the door. More specifically, clearances between inner door trims and the corresponding outer body structure of the vehicle may be reduced to approximately 20 millimeters or less in many vehicle designs. These clearances do not leave sufficient space for an operative armrest to be affixed to the vehicle door assembly. Furthermore, increasing the clearances between the inner door trim and the outer body of the vehicle would require the use of larger, heavier tracking components which would add weight and cost to the vehicle design.

Conventionally, it is known to use a folding armrest to minimize the required clearances between the inner door trim and the outer body of the vehicle. By way of example, it is known to have an armrest operative for use with a sliding door, wherein the armrest is pivotally connected to the vehicle door assembly and arranged to automatically pivot between a vertical, non-use position when the door is open to a horizontal, open position when the door is closed. However, such conventional designs rely on various drive systems, including either pneumatic drive mechanisms, electric motors or flexible drive cables to pivot the armrest. Such designs greater increase the level of complexity for manufacture and assembly and the cost associated with producing such a vehicle door assembly. Similarly, it is known to have an armrest operative for use with a sliding door wherein the armrest is pivotally connected to the vehicle body and arranged to automatically pivot between a vertical, non-use position when the door is open to a horizontal, open position when the door is closed. However, such designs are bulky, not aesthetically pleasing and difficult to reconfigure for use on a sliding door. Accordingly, it is desirable to provide an armrest for a sliding door of a motor vehicle, which accommodates the minimal clearance between the door trim and the vehicle outer body when the door is opened while introducing a lower cost solution with a minimum amount of complexity to the door assembly.

BRIEF SUMMARY OF THE INVENTION

In various exemplary embodiments, the present invention described herein overcomes the above-referenced shortcomings of conventionally known armrests operable for use with motor vehicle sliding door designs by providing a vehicle sliding door having a recess or cavity formed therein with an interior armrest pivotally movable with respect to the cavity between a horizontal use position and a vertical storage position within the cavity. In all exemplary embodiments, the armrest generally includes an actuation mechanism located about a shaft for permitting manual pivoting of the armrest to the horizontal use position when the door is in the closed position. Further, the armrest may include a securing element for securing the armrest in position when the armrest is manually pivoted open to the use position. Still further, the armrest may include a release mechanism and a biasing element for automatically retracting the armrest to a vertical, non-use position when the vehicle door is engaged to be opened. Advantageously, the armrest of the present invention provides a lower cost solution to that of conventional armrest designs and offers additional cargo space along with additional room for occupants when in the closed position. Further, the armrest of the present invention allows a sliding door type of opening to provide a more desirable offset to the body (e.g., less stress on sliding door arm and mechanisms). Other comparable uses are also contemplated herein, as will be obvious to those of ordinary skill in the art.

In exemplary embodiments, the present invention provides a motor vehicle structure including a vehicle body and a sliding door movable in forward and rearward directions between open and closed positions with respect to the vehicle body. The door includes a cavity formed therein. An interior armrest is provided and operable for pivotal movement about a pivot axis between a horizontal position for use as an armrest and a vertical non-use position for storage within the cavity. The pivot axis is substantially parallel to the forward and rearward directions of the doors sliding movement. The armrest is mounted about a shaft and includes an actuation mechanism for permitting manual pivoting movement of the armrest to the horizontal use position when the door is closed. The actuation mechanism may be comprised of a biasing element, preferably a spring, which is biased to automatically return the armrest to the upright or closed position. Further, the armrest includes a securing element for securing the armrest in position when it is manually opened to the use position. Finally, the actuation mechanism includes a solenoid or momentary cable which is arranged to release the pin upon actuation of the solenoid or momentary cable by the door release mechanism.

The securing element is configured to automatically release the armrest and retract the same to the closed position when the vehicle door is engaged to be opened. The securing element may include a pin that is arranged within the armrest to permit a seat occupant to swing the armrest downward and lock the armrest into the open position when the door is closed.

Turning now to the operation of the present invention, the biasing element located within the armrest is intended to maintain the armrest in its closed position during its normal operation. When the door is closed, the seat occupant may elect to pivot the armrest about the shaft into its open position. When moved to an open position, the pin located within the armrest acts to counter the bias provided by the biasing element and lock the armrest into its open position. When the seat occupant actuates the door handle in an attempt to open the sliding door, the door release mechanism automatically actuates the solenoid or momentary cable to release the pin. Once the pin is released, the armrest will be unlocked from its open position and the biasing element will bias the armrest into its upright or closed position to provide the prerequisite clearance between the inner door trim and the outer body of the vehicle. Alternatively, it will be appreciated by those skilled in the art that the seat occupant may elect to maintain the armrest in the closed position when the sliding door is closed.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

The present disclosure is illustrated and described herein with reference to the various drawings, in which like reference numbers denote like system components and/or method steps, respectively, and in which:

FIG. 3 illustrates a side perspective view of an armrest in its open position in accordance with an exemplary embodiment of the present invention; and FIG. 4 illustrates a side perspective view of an armrest in its open position in accordance with an exemplary embodiment of the present invention.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

In various exemplary embodiments, the present invention described herein provides a folding interior armrest operable for use with an automotive vehicle such as a van, mini-van or truck. The interior armrest is pivotally movable with respect to a cavity or recess contained within the door trim of a door of the automotive vehicle between a horizontal use position and a vertical non-use, storage position within the cavity. The armrest generally includes an actuation mechanism located about a shaft for permitting manual pivoting of the armrest to the horizontal use position when the door is in the closed position. Further, the armrest may include a securing element for securing the armrest in position when the armrest is manually pivoted open to the use position. The armrest also provides a biasing element which automatically retracts the armrest to the vertical non-use position when the vehicle door is engaged to be opened. As previously stated, the armrest of the present invention advantageously provides a lower cost solution to that of conventional armrest designs via a simplified design and a lesser number of components for assembly. Further, the armrest of the present invention advantageously offers additional cargo space along with additional room for occupants when in the closed position. Still further, the armrest of the present invention allows a sliding door type of opening to provide a more desirable offset to the body (e.g., less stress on sliding door arm and mechanisms).

Figure 2:
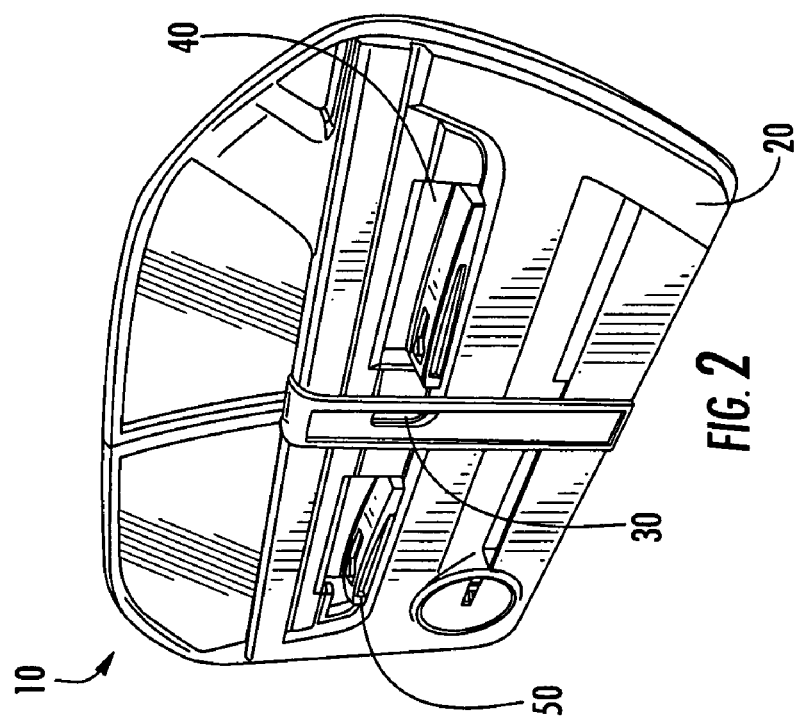
FIG. 2 illustrates a side perspective view of a vehicle door assembly having an armrest in its open position in accordance with an exemplary embodiment of the present invention.
Figure 1:
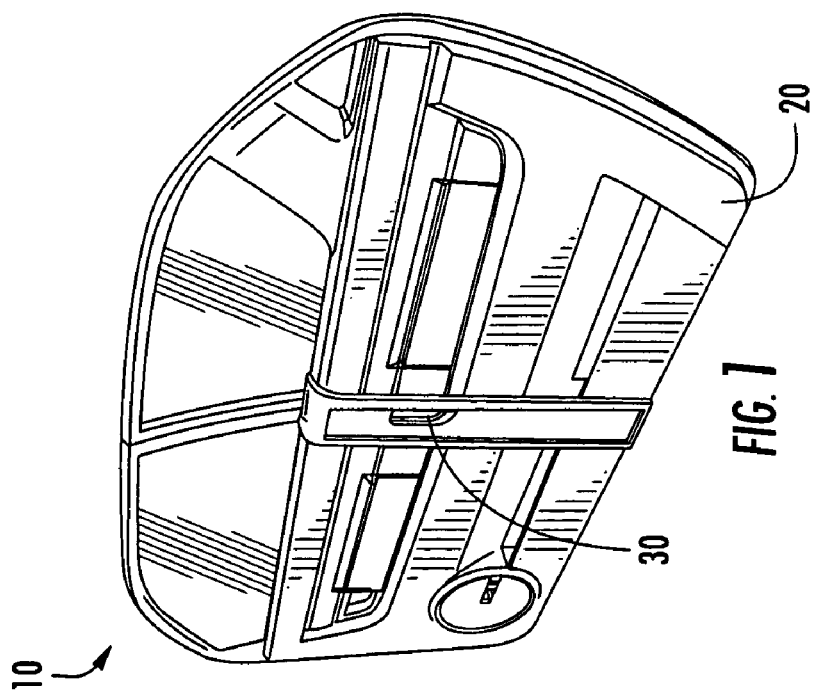
FIG. 1 illustrates a side perspective view of a vehicle door assembly having an armrest in its upright position in accordance with an exemplary embodiment of the present invention.

In accordance with an exemplary embodiment of the present invention, as best shown in FIG. 1, a door structure 10 is provided in a motor vehicle body (not shown). The door 10 is generally movable in forward and rearward directions between opened and closed positions, with respect to the vehicle body. Further, in exemplary embodiments, the door 10 is a sliding door which is located between the "B" pillar and "C" pillar of a van, mini-van or truck. However, it will be understood by those skilled in the art that the present invention may be suitable for any door of any vehicle type. As shown in FIG. 1, the door 10 generally includes an outer panel (not shown) and an inner panel (not shown) attached together in a spaced apart relationship by known techniques, such as by welding and hem flanging. The panels are joined together having a space such that storage is provided for a window panel and other vehicle components. The inner door panel is concealed by door trim 20 and both the outer and inner panels include at least one door handle 30 having a door release mechanism (not shown) which is operable for allowing a user to open and close the door 10. As best shown in FIG. 2, the door trim 20 is configured to provide at least one cavity or recess 40 for receiving and retaining at least one interior armrest 50. The at least one interior armrest 50 is provided and is operable for pivotable movement about a pivot axis between a use position and a non-use position within the cavity 40. It will be understood by those skilled in the art that the number of armrests may vary depending on the number of rows of occupant seats. Further, the armrest 50 may be manufactured from any variety of materials, including flexible synthetic and or polymeric materials.

Referring now to FIGS. 3 and 4, the armrest 50 is shown as being attached to the door 10 by a shaft 60 and is configured to pivot about the shaft 60 along pivot Axis A between a vertical, non-use or closed position (FIG. 1), where the armrest 50 is retracted within the recess 40, and the horizontal, opened or use position (FIG. 2), for use as an armrest 50 when the door 10 is closed. It will be understood by those skilled in the art that, in exemplary embodiments, the pivot Axis A is positioned at the bottom of the cavity 40 such that the armrest 50 rotates or moves up about the shaft 60 to a closed position. Further, the pivot Axis A is substantially parallel to the directions of forward and rearward movement of the door 10. Of course, the pivot Axis A could alternatively be positioned at the top of the cavity 40 so that the armrest 50 pivots or rotates downward about the shaft 60 to an opened position.

As illustrated, the armrest 50 generally includes a generally hollow housing 55 defining an inner cavity 56 and a retention port 57 for retaining various items including drinking containers. In exemplary embodiments, the housing 55 of the armrest 50 may include a full complement of sensors (not shown) and controllers (not shown) for sensing and controlling certain vehicle functions which are commonly known and used in the automotive industry. Further, the armrest 50 includes within the inner cavity 56 of the housing 55 an actuation mechanism 70 which is configured to automatically pivot the armrest 50 into the closed position in the counter direction of Arrow B as the door 10 is opened. In an exemplary embodiment of the present invention, the actuation mechanism 70 is comprised of a securing element 90 for securing the armrest 50 in an open position and biasing element 80 which is biased to automatically return the armrest 50 to the upright or closed position. In exemplary embodiments, the biasing element 80 is a spring. It will readily be understood that any suitable type of spring may be employed including but not limited to torsion springs and coils springs. With the use of a spring as the biasing element 80, provision is provided to the armrest 50 to be prestressed in a direction of rotation such that a greater force is required in order to move or pivot the armrest 50 to a horizontal opened position. Further, the use of the spring provides automatic movement of the armrest 50 in a direction about the shaft 60 to the retracted or closed position when the armrest 50 is not secured in an opened position by the securing element 90.

In exemplary embodiments, the actuation mechanism 70 is also provided with the securing element 90 which, as stated, is operable for securing the armrest 50 in an open position when the same is manually rotated about the shaft 60. The securing element 90 may include a pin 100 that is arranged within the armrest 50 to permit an occupant to manipulate the armrest 50 downward and lock the armrest 50 into the open position when the door 10 is closed. Alternatively, the securing element 90 may include a clip-type latch in place of the pin. The clip-type latch may be configured to lock and retain the armrest in position. In exemplary embodiments, the actuation mechanism 70 may also include a solenoid 110 which is arranged to release the pin 100 upon actuation of the solenoid 110 by the door release mechanism. In other exemplary embodiments, the actuation mechanism is provided with a momentary cable in place of the solenoid 110 for performing the same functionality.

Turning now to the operation of the present invention, the biasing element 80 located within the armrest 50 is intended to maintain the armrest 50 in its closed position during its normal operation. When the door 10 is closed, the seat occupant may elect to pivot the armrest 50 about the shaft 60 into its open position. As previously discussed, the pin 100 located within the armrest 50 will counter the bias provided by the biasing element 80 and lock the armrest 50 into its open position. When the seat occupant actuates the door handle 30 in an attempt to open the door 10, the door release mechanism automatically actuates the solenoid 110 to release the pin 100. Likewise, when a user actuates the outer door handle in an attempt to open the door, the armrest is retracted. Once the pin 100 is released, the armrest 50 will be unlocked from its open position and the biasing element 80 will bias the armrest 50 into its upright or closed position to provide the prerequisite clearance between the inner door trim 40 and the outer body of the vehicle. Alternatively, it will be appreciated by those skilled in the art that the seat occupant may elect to maintain the armrest 50 in the closed position when the sliding door 10 is closed. For example, in the closed position, the door 10 offers additional cargo room along with additional hip room for the occupants.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A vehicle comprising:
   a vehicle body;
   a sliding door movable in forward and rearward directions between open and closed positions with respect to the vehicle body, said door having a cavity formed therein;
   an armrest pivotally movable about a pivot axis between a horizontal position for use as an armrest and a vertical position for storage within the cavity, said pivot axis being substantially parallel to said forward and rearward directions; and
   wherein the armrest includes an onboard actuator comprised of an onboard solenoid enabling movement of the armrest to the vertical position from the horizontal position.

2. The vehicle of claim 1, further including a securing element for securing the armrest in the horizontal use position.

3. The vehicle of claim 2, wherein the securing element is configured to automatically release the armrest and retract the armrest to the vertical position when the sliding door is engaged to be opened.

4. The vehicle of claim 2, wherein the securing element is a pin.

5. The vehicle of claim 1, wherein the actuator is comprised of a biasing element which is biased to automatically return the armrest to the vertical position.

6. The vehicle of claim 5, wherein the biasing element is a spring.

7. The vehicle of claim 6, wherein the spring is a torsion spring.

8. The vehicle of claim 4, wherein the solenoid is arranged to release the pin upon actuation of the solenoid by a door release mechanism.

9. The vehicle of claim 1, wherein the armrest is attached to the sliding door by a shaft extending longitudinally through the armrest and defining a longitudinal pivot axis extending through the armrest for permitting rotational movement of the armrest about the longitudinal pivot axis between the horizontal and vertical positions.

10. An interior armrest for a sliding door assembly of a vehicle, comprising:
    a housing pivotally movable about a pivot axis that extends longitudinally relative to the housing between a horizontal position for use as an armrest and a vertical position for storage;
    an actuator disposed within the housing enabling movement of the housing to the vertical position from the horizontal position when the sliding door assembly is engaged to be opened;
    a biasing element disposed within the housing biasing the housing toward the vertical position; and
    wherein the housing is disposed within a recess of the sliding door assembly when in the vertical position.

11. The interior armrest of claim 10, further comprising a securing element disposed within the housing for securing the housing in the horizontal position.

12. The interior armrest of claim 11, wherein the securing element is configured to automatically release the housing when the sliding door assembly is engaged to be opened.

13. The interior armrest of claim 11, wherein the securing element is a pin.

14. The interior armrest of claim 10, wherein the actuator is comprised of a solenoid disposed within the housing that cooperates with the biasing element which is biased to automatically return the armrest to the vertical position upon actuation of the solenoid when the sliding door is engaged to be opened.

15. The interior armrest of claim 10, wherein the biasing element is a spring.

16. The interior armrest of claim 15, wherein the spring is a torsion spring.

17. The interior armrest of claim 13, wherein the actuator further comprises a solenoid which is arranged to release the pin upon actuation of the solenoid by a door release mechanism.

18. A door assembly of a vehicle, comprising:
a door structure comprised of door trim with a recess disposed therein and a door handle; and
an armrest comprised of a housing having an inner cavity through which extends a shaft attached to the door that carries the armrest, and an actuation mechanism disposed in the inner cavity that comprises an actuator in the inner cavity and a biasing element in the inner cavity cooperating to enable pivotable armrest movement to one of a vertical storage position where the armrest is disposed within the recess and a horizontal armrest position where the armrest extends outwardly from the recess.

19. The vehicle door assembly of claim 18, wherein the actuator comprises a solenoid and the biasing element comprises a torsion spring and wherein actuating the door handle automatically actuates the solenoid pivoting the armrest into the vertical storage position.

20. The vehicle door assembly of claim 19, wherein the actuation mechanism further comprises a securing element disposed in the inner cavity that secures the armrest in the horizontal armrest position.

* * * * *